(12) United States Patent
Hartman

(10) Patent No.: US 8,386,449 B2
(45) Date of Patent: Feb. 26, 2013

(54) CUSTOMER STATISTICS BASED ON DATABASE LOCK USE

(75) Inventor: Philip Thomas Hartman, Goodlettsville, TN (US)

(73) Assignee: International Business Machines Corporation, Armonk, NY (US)

(*) Notice: Subject to any disclaimer, the term of this patent is extended or adjusted under 35 U.S.C. 154(b) by 1979 days.

(21) Appl. No.: 11/046,390

(22) Filed: Jan. 27, 2005

(65) Prior Publication Data

US 2006/0167878 A1 Jul. 27, 2006

(51) Int. Cl.
*G06F 17/30* (2006.01)

(52) U.S. Cl. .................. 707/704; 707/781; 707/783

(58) Field of Classification Search .............. 707/8, 1, 707/103, 704, 737, 613, 615, 781, 783; 705/52
See application file for complete search history.

(56) References Cited

U.S. PATENT DOCUMENTS

| | | | |
|---|---|---|---|
| 5,551,046 A | 8/1996 | Mohan et al. | |
| 5,734,909 A * | 3/1998 | Bennett | 710/200 |
| 5,913,213 A * | 6/1999 | Wikstrom et al. | 707/8 |
| 6,108,654 A | 8/2000 | Chan et al. | |
| 6,189,007 B1 | 2/2001 | Boonie et al. | |
| 6,697,901 B1 | 2/2004 | Shun Chan | |
| 6,715,146 B1 | 3/2004 | Simmons et al. | |
| 7,343,432 B1 * | 3/2008 | Niver et al. | 710/36 |
| 8,024,361 B2 * | 9/2011 | Daughtry et al. | 707/786 |
| 2002/0169775 A1 | 11/2002 | Meng | |
| 2003/0004924 A1 * | 1/2003 | Williams | 707/1 |
| 2003/0217152 A1 | 11/2003 | Kasper, III | |
| 2004/0078360 A1 | 4/2004 | DeFauw | |
| 2004/0199734 A1 * | 10/2004 | Rajamani et al. | 711/163 |
| 2004/0230560 A1 * | 11/2004 | Elza et al. | 707/1 |
| 2005/0289143 A1 * | 12/2005 | Oshri et al. | 707/8 |
| 2006/0031427 A1 * | 2/2006 | Jain et al. | 709/220 |
| 2006/0184528 A1 * | 8/2006 | Rodeh | 707/8 |
| 2007/0150474 A1 * | 6/2007 | Szilagyi et al. | 707/8 |
| 2008/0010283 A1 * | 1/2008 | Cornwell et al. | 707/8 |
| 2011/0113059 A1 * | 5/2011 | Lee et al. | 707/769 |

OTHER PUBLICATIONS

Liu, et al., Distributed Locking Facility for Multi-System Data Sharing, IBM Technical Disclosure, Jun. 1998, pp. 206-211.

* cited by examiner

*Primary Examiner* — Sherief Badawi
(74) *Attorney, Agent, or Firm* — Yudell Isidore Ng Russell PLLC

(57) ABSTRACT

A method and service for establishing a web-based network that includes an enterprise locking service. The enterprise locking service is able to coordinate multiple, cooperating applications that need to ensure that one and only one user is modifying a database record at a given time. These database records may be stored in multiple databases having potentially different database record locking protocols. Through monitoring and tracking of requests for database locks, the enterprise locking service is also able to determine database usage trends under various metrics.

18 Claims, 9 Drawing Sheets

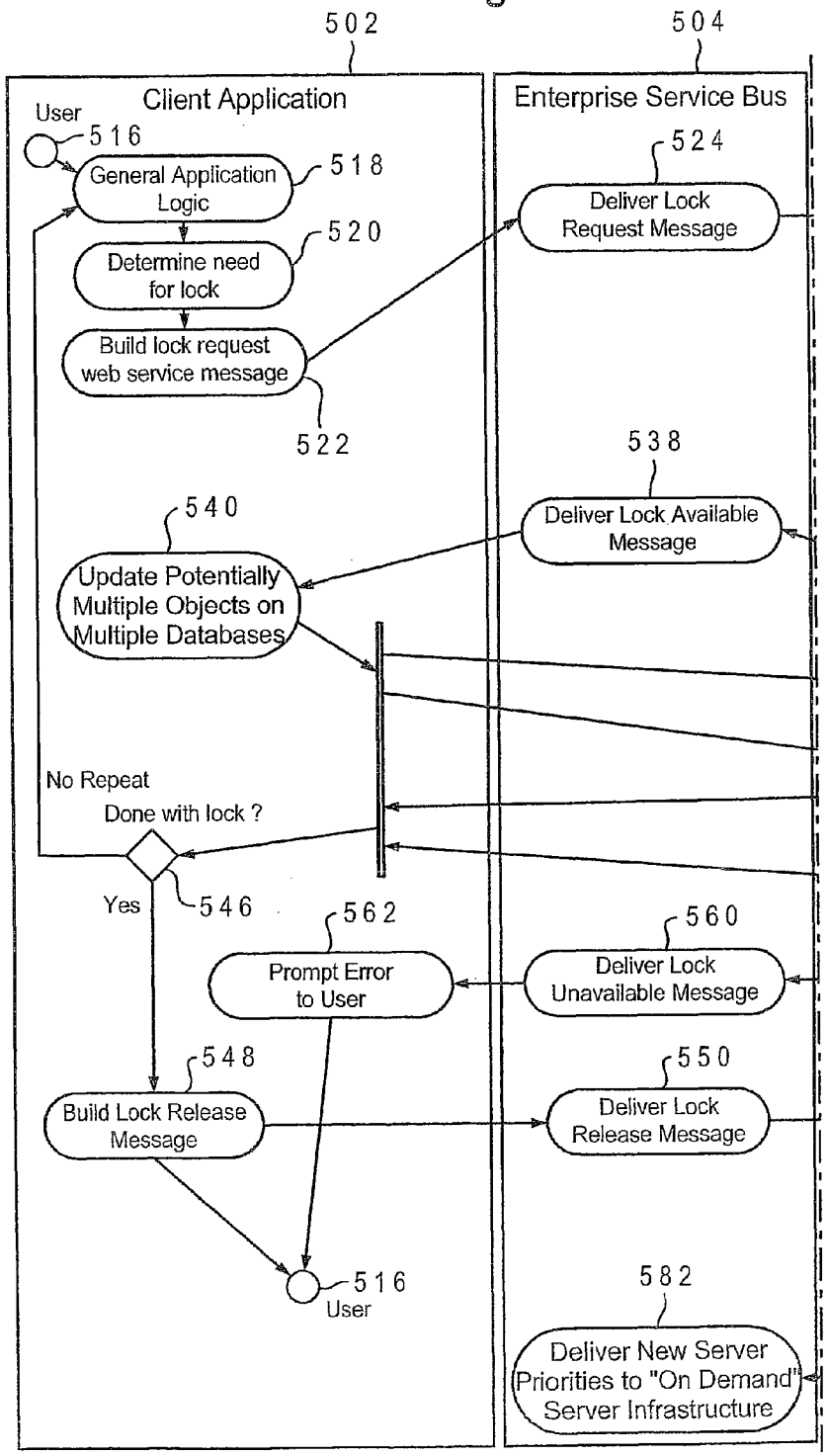

CUSTOMER STATISTICS BASED ON DATABASE LOCK USE

BACKGROUND OF THE INVENTION

1. Technical Field

The present invention relates in general to the field of on-demand computer databases, and in particular to database locks for use with the on-demand computer databases. Still more particularly, the present invention relates to a method and service for monitoring use of database locks to describe and evaluate customer use of the on-demand computer databases.

2. Description of the Related Art

In an effort to become more responsive to changing business needs, many companies are incorporating the services of third-party Information Technology (IT) service providers. One example of such a service provider is IBM's On-Demand Business™ service provided by International Business Machines Corporation of Armonk, N.Y.

One aspect of IBM's On-Demand Business™ service is illustrated in FIG. 1 as an Operating Environment Architecture (OEA) 100. A user 102 is able to communicate with multiple application services 104 via an interface identified as business services 106. Application services 104, via a middleware depicted as Enterprise Service Bus (ESB) 108, is able to access a variety of infrastructure services 110. As depicted, infrastructure services 110 include utility business services, service level automation and orchestration, and resource virtualization services. As discussed below, businesses 112 are also able to communicate with user 102 and infrastructure services 110 via enterprise service bus 108.

An example of the OEA 100 and its use is as follows. User 102 might be a call center, which can receive a call from a truck driver who is on the road and needing a truck tire to be replaced by the side of the road. The truck driver (not shown) can contact the call center requesting such assistance. The call center (user 102) accesses an appropriate application service, such a user access service, user interaction service, business process choreography service, business function service, common service and/or information management service. These application services establish the appropriate protocol to send the request for flat tire assistance to the ESB 108, which forwards the service request to a business 112, such as a tire service company. In addition, business 112 may also be the owner of the truck (or fleet) being driven by the driver who requested the road service, thus permitting the fleet owner to access databases in infrastructure services 110. The fleet owner is thus able to access the database in the infrastructure services 110 to monitor what service has been requested and the charge for that service. The call center (user 102) interfaces with the driver who requested the tire service, and a new tire is delivered (or the old tire is repaired). In this scenario, the database record associated with the service call may be locked for tens of minutes while the call center tries to locate a nearby service provide available to provide the service.

Note again that application services 104 and infrastructure services 110 are accessible to multiple users 102 and businesses 112, thus making the On-Demand OEA 100, scalable, flexible, expandable, but also in need of coordination and control.

One area of control that is required is control of various databases, including those found in infrastructure services 110. For example, one or more of the databases in infrastructure services 110 may need to be temporarily locked while order information, billing information, etc., is being accessed and/or updated by either a user 102 or a business 112. This locking procedure is accomplished by a specialized piece of software known as a database lock. In the prior art, each database software vendor for a particular database required a user 102 (or a business 112) to be in communication with that database and to use a particularly formatted database lock to lock a database. This has proven cumbersome, and thus there is a need for a universal database locking system that is able to lock any of the databases, no matter which database software vendor is supplying/maintaining the databases.

In addition to the need for establishing a universal database locking system, there is also a need for a method and service to monitor and evaluate the use of database locks, thus providing information regarding which databases are being used and under what parameters (by whom, where, when, etc.).

SUMMARY OF THE INVENTION

The present invention is thus directed to a method and service for establishing a web-based network that includes an enterprise locking service. The enterprise locking service is able to coordinate multiple, cooperating applications that need to ensure that one and only one user is modifying a database record at a given time. These database records may be stored in multiple databases having potentially different database record locking protocols. Through monitoring and tracking of requests for database locks, the enterprise locking service is also able to determine database usage trends under various metrics.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 2:
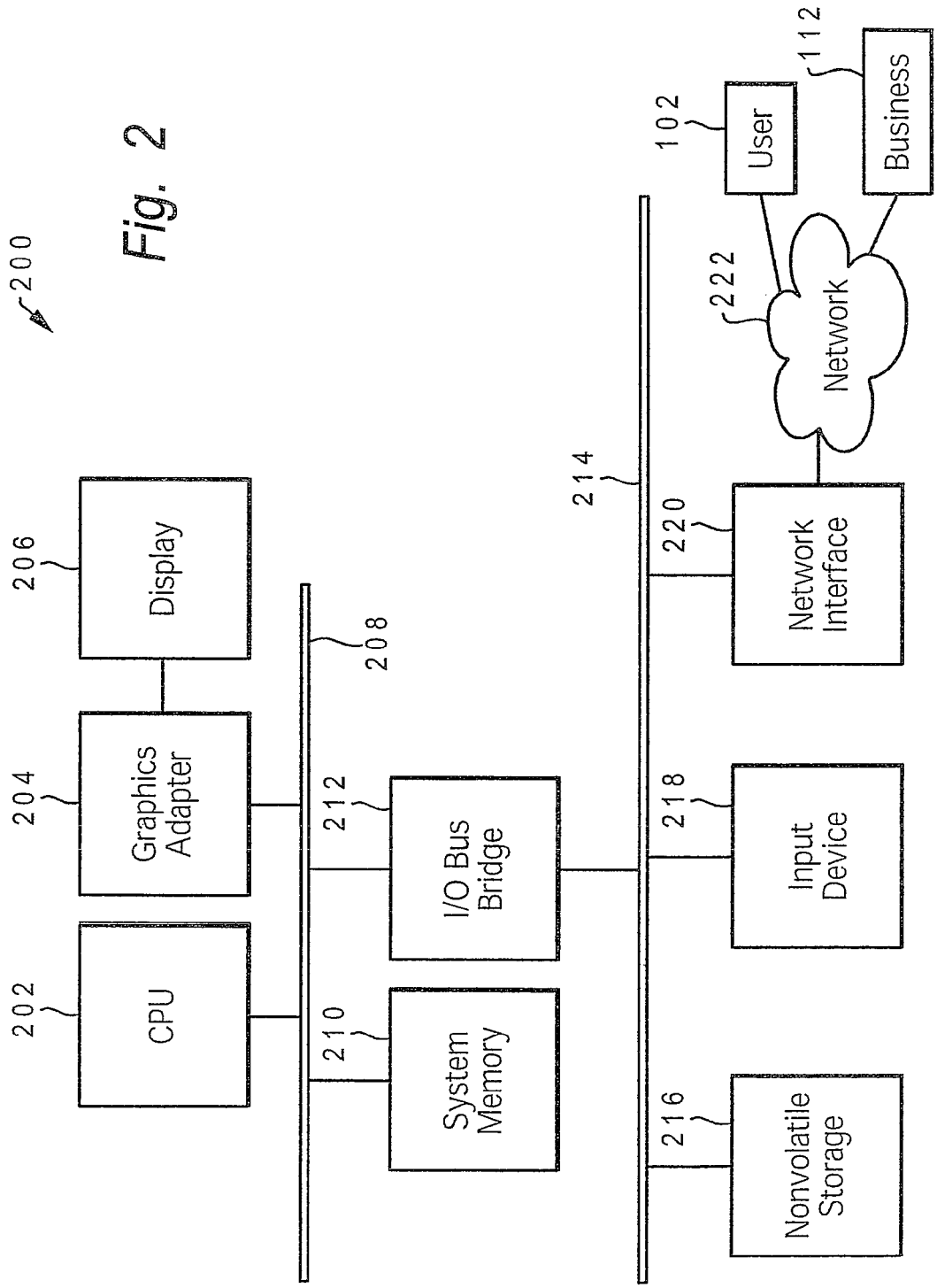
FIG. 2 is a block diagram of an exemplary computer system that may be used by the present invention.

With reference now to FIG. 2, there is depicted a block diagram of an exemplary data processing system in which a preferred embodiment of the present invention may be implemented. Data processing system 200 may be, for example, one of the models of personal or server computers available from International Business Machines Corporation of Armonk, N.Y. Data processing system 200 includes a central processing unit (CPU) 202, which is connected to a system bus 208. In the exemplary embodiment, data processing system 200 includes a graphics adapter 204, which is also connected to system bus 208, for providing user interface information to a display 206.

Also connected to system bus 208 are a system memory 210 and an input/output (I/O) bus bridge 212. I/O bus bridge 212 couples an I/O bus 214 to system bus 208, relaying and/or transforming data transactions from one bus to the other. Peripheral devices such as nonvolatile storage 216, which may be a hard disk drive, optical drive, or similar mass storage device(s). Also attached to I/O bus 214 is an input device 218, which may include a conventional mouse, a trackball, or the like, as well as a keyboard or similar device.

Figure 1:
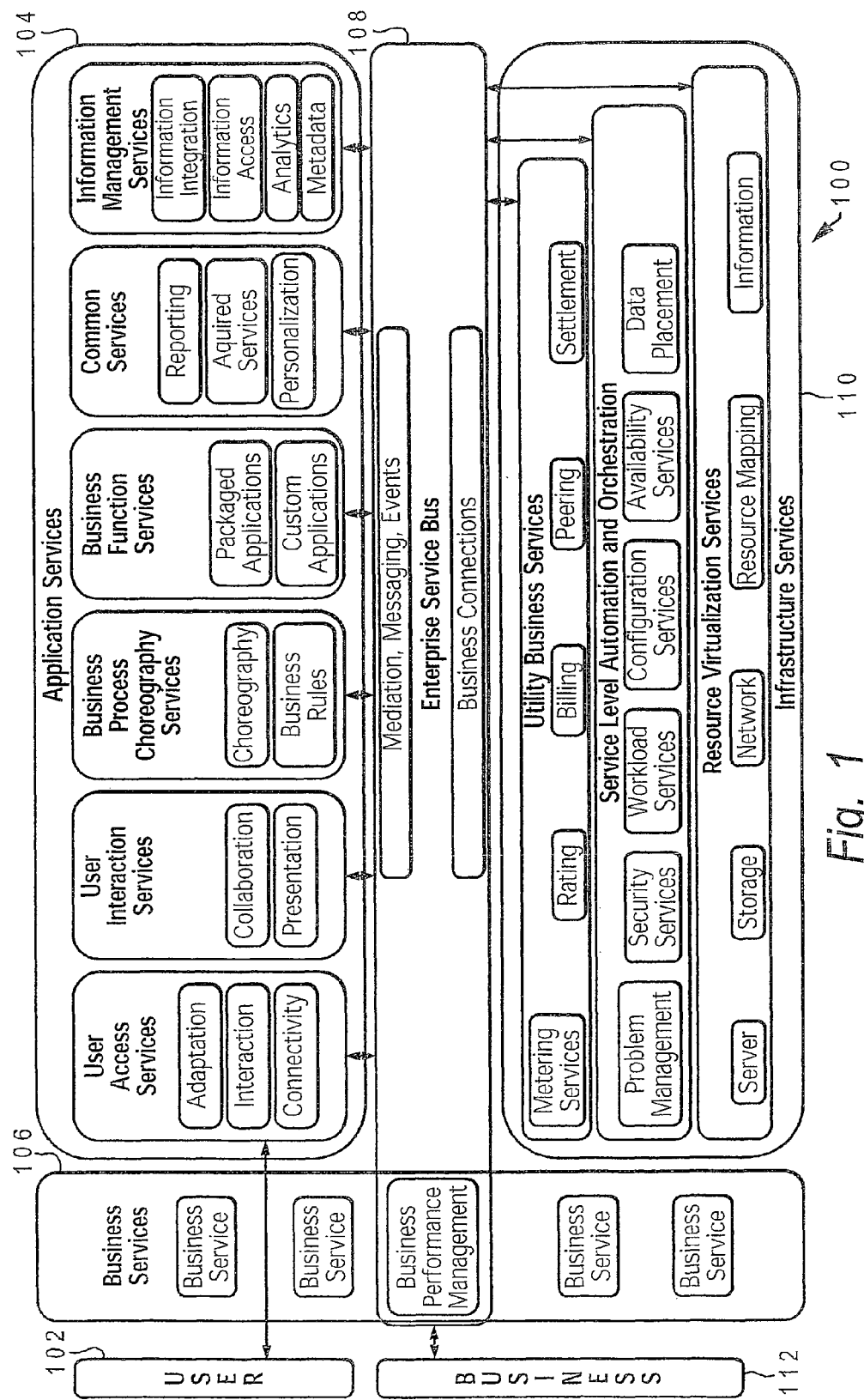
FIG. 1 depicts a prior art On Demand Operating Environment Architecture (OEA)

Also coupled to I/O bus 214 is a network interface 220, which provides network communication via a network 222 to remote devices, including computer logic and/or software described and identified in FIG. 1 as user 102 and/or business 112.

The exemplary embodiment shown in FIG. 2 is provided solely for the purposes of explaining the invention and those skilled in the art will recognize that numerous variations are possible, both in form and function. For instance, data processing system 200 might also include a sound card and audio speakers, and numerous other optional components. All such variations are believed to be within the spirit and scope of the present invention.

Figure 3:
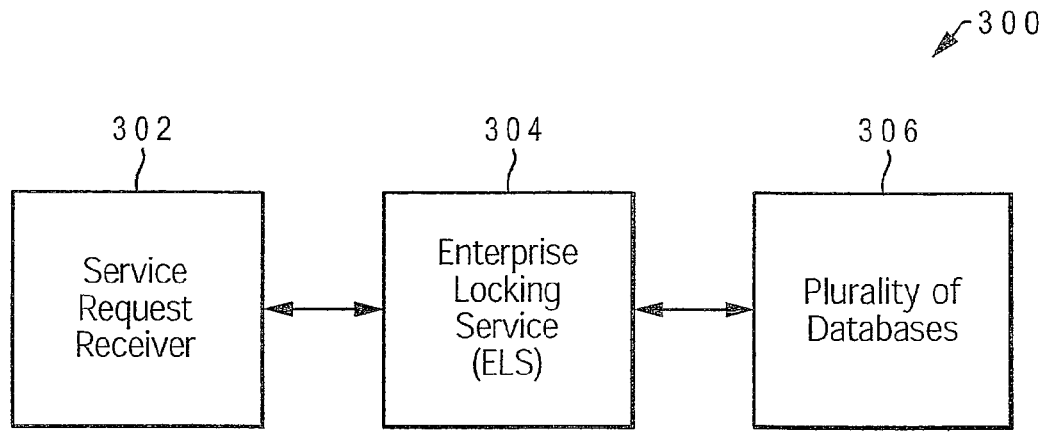
FIG. 3 is a block diagram of an On Demand service that incorporates the inventive Enterprise Locking Service (ELS)

With reference now to FIG. 3, there is illustrated a block diagram of an Operating Environment Architecture (OEA) 300. OEA 300 includes a service request receiver 302, which communicates with an Enterprise Locking Service (ELS) 304, which communicates with a plurality of databases 306. Databases 306 are maintained by one or more business service providers, which preferably do not maintain/operate ELS 304. Service request receiver 302 may be a user, such as user 102 or a business 112 described in FIG. 1. That is, service request receiver 302 is any entity wishing to utilize ELS 304 to lock/unlock one or more of the plurality of databases 306 in accordance with the present invention. In an exemplary form, databases 306 may be included in infrastructure services 110 described above in FIG. 1.

Figure 4:
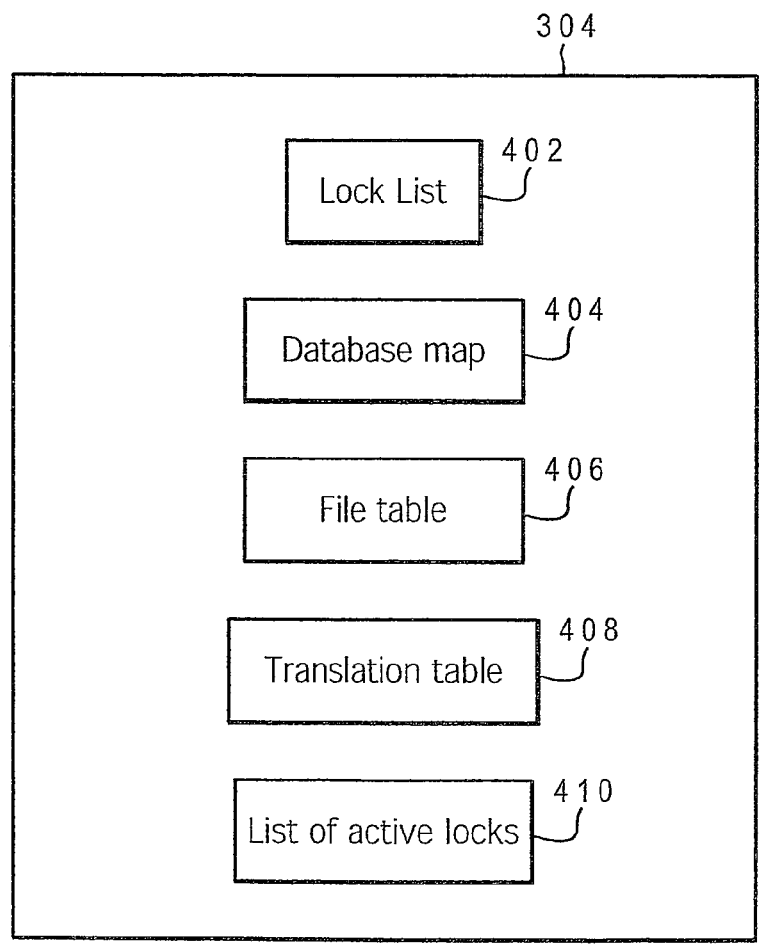
FIG. 4 is a block diagram of additional details of the ELS shown in FIG. 3.

With reference now to FIG. 4, a block diagram showing additional details of ELS 304 is provided. ELS 304 includes, but is not limited to, the following features. A lock list 402 includes a list of database locks identified with a particular client. That is, lock list 402 includes a list of database locks which are able to lock one or more of the plurality of databases 306 shown in FIG. 3, and associated with each of these database locks are the entities which are authorized to use the database lock. These entities may be identified as clients, customers, users, business, sessions, etc. Alternatively, lock list 402 may be a list of entities, with database locks associated with each of the entities.

ELS 304 also includes a map 404 of all databases that need to be simultaneously locked by an entity. For example, when an entity locks a first database, because of relational issues, a second database may also need to be simultaneously locked to maintain data coherency.

A file table 406 is also located in ELS 304. File table 406 is a table of all files in all databases. Thus, when an entity requests that only a particular file in a database be locked, file table 406 can identify the particular file in order to transmit the database lock to only lock out that particular file.

As mentioned above, databases maintained by different vendors may have differently formatted database locks. For example, some database locks may be strings while other database locks are numeric values. Thus, ELS 304 has a translation table 408, which is able to translate (format) the authorized database lock into a style that is understood by the database that is to be locked.

ELS 304 also has a list of active locks 410, which includes information on which client (if any) has currently locked up a database record, the expiration time (or period) of the database lock (if any), etc. Thus, if a first client requests a database lock on a particular database record, and that database record has already been locked by a second client, then list of active locks 410 can provide information to the first client regarding what entity is currently locking up the database. This allows the first client the option of contacting the second client, either through software, automatic dial-up, or voice communication, requesting that the second client to release the lock on the database record.

Figure 5B:
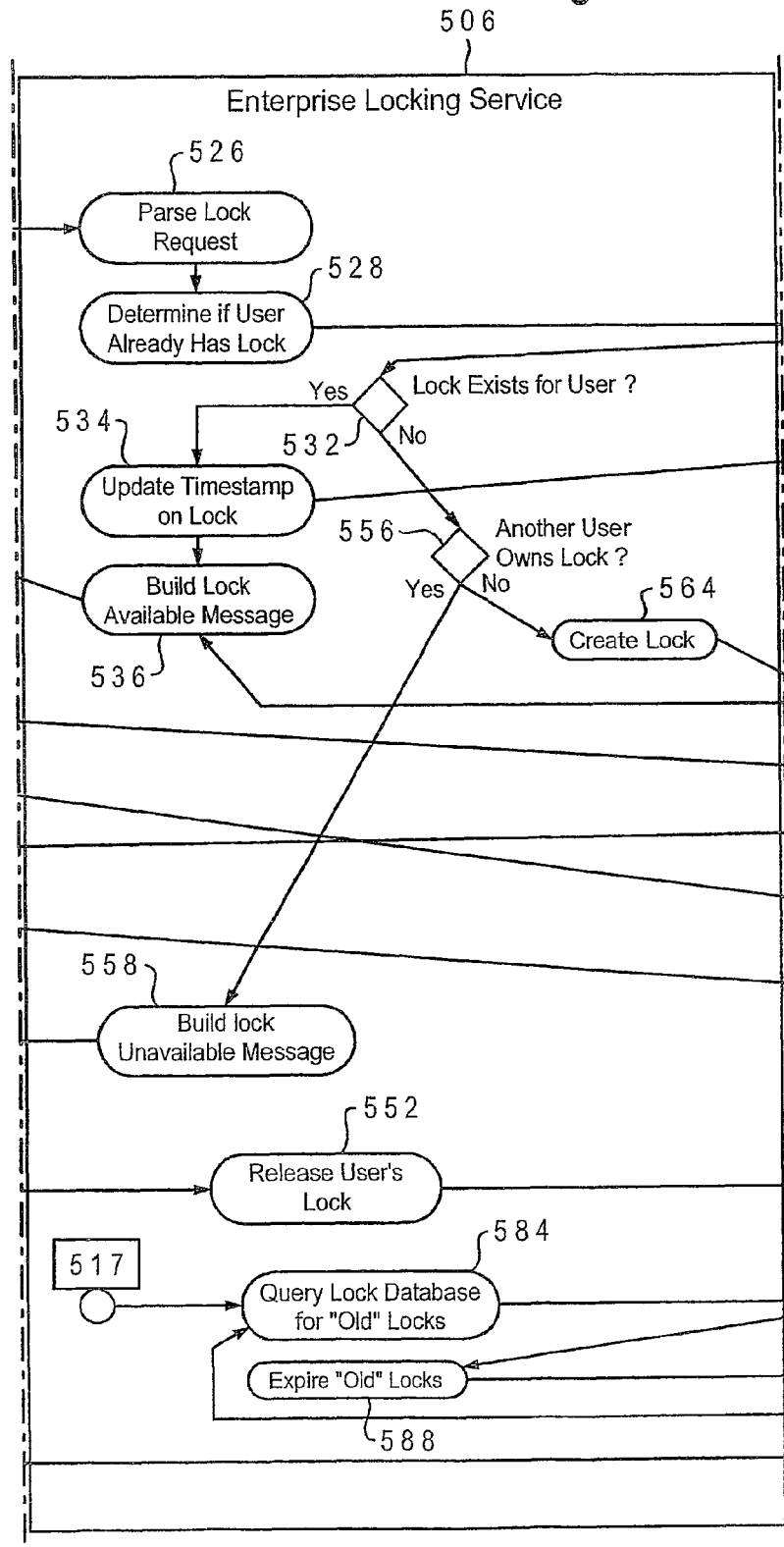
FIG. 5 is a swim-lane diagram showing steps taken in a preferred embodiment of the present invention to lock databases and to monitor trends of database usage according to requested database locks.
Figure 5C:
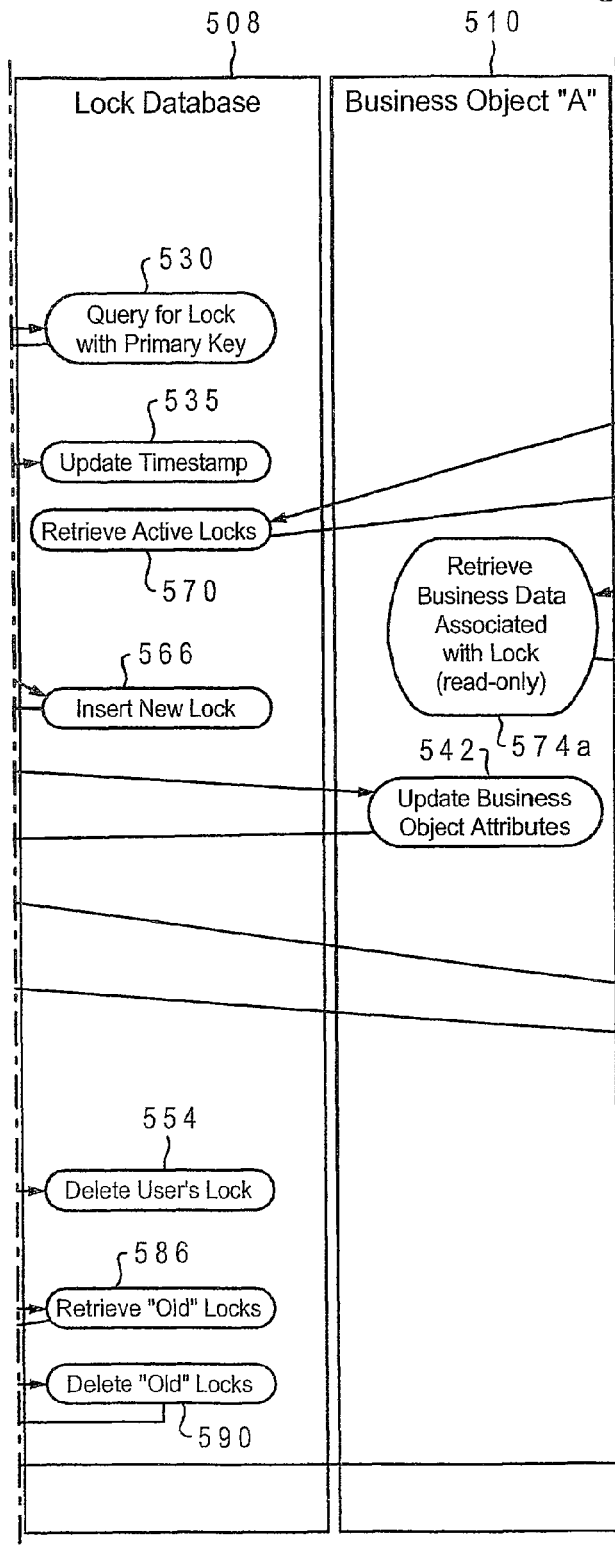
Figure 5D:
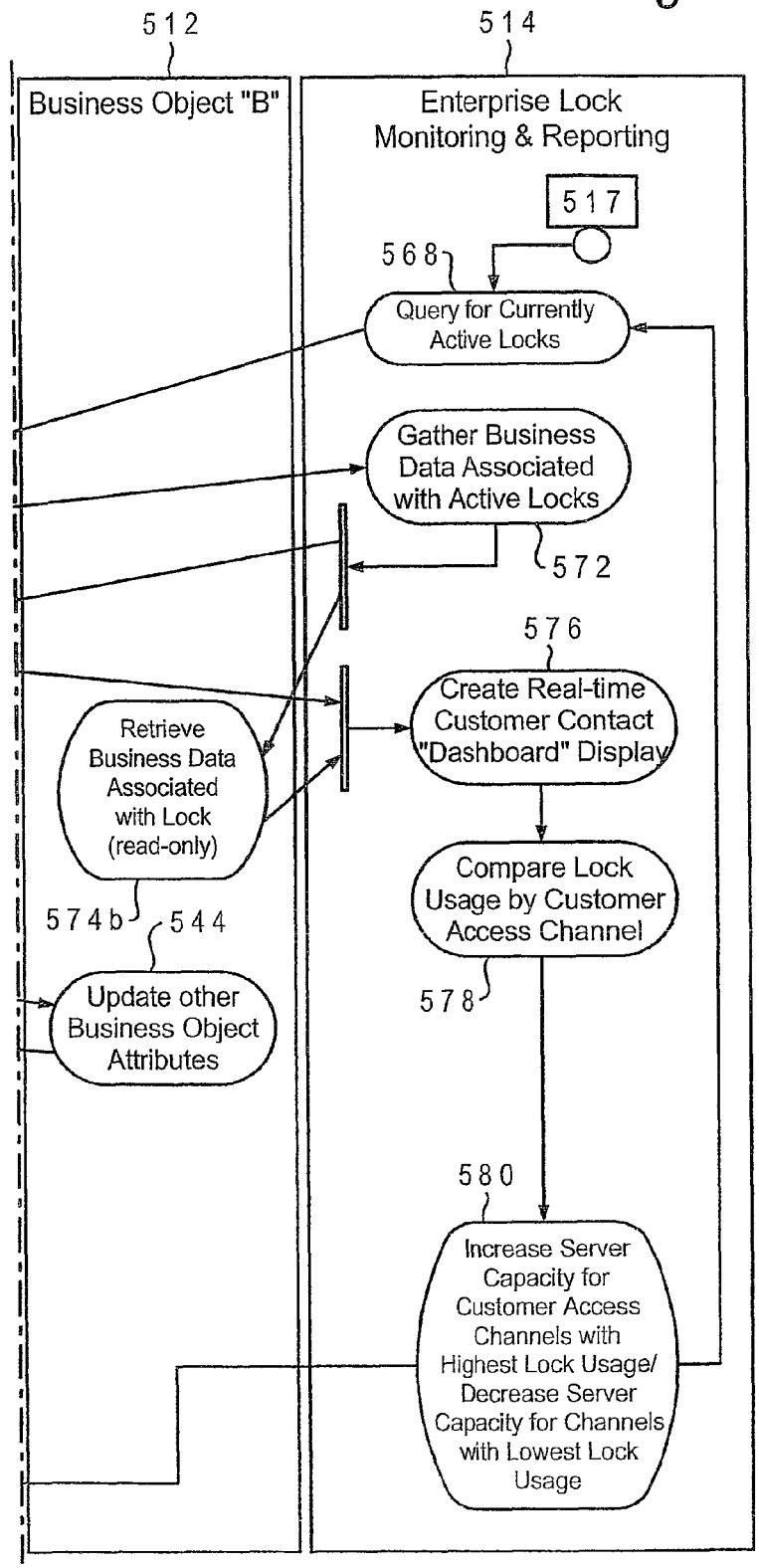

With reference now to FIG. 5, there is depicted a "swim-lane" diagram of enterprise locking service interactions in accordance with a preferred embodiment of the present invention. FIG. 5 depicts seven "swim-lanes."

The first swim-lane is a client application 502, which is preferably a session enterprise Java bean, which is part of a large Java 2 Enterprise Edition (J2EE) application. Client application 502 may operate anywhere within an OEA 100, as depicted in FIG. 1, but is preferably functioning with application services 104.

The second swim-lane in FIG. 5 is an enterprise service bus 504, which is middleware as described above in FIG. 1 for enterprise service bus 108.

The third swim-lane is an enterprise locking service 506, which is part of ELS 304 (described above in FIG. 3). Besides the functions described below, enterprise locking service 506 determines if a database lock is needed and available, and builds a database lock entry to insert in the lock list 410 if necessary.

The fourth swim-lane is a lock database 508, which is also included in ELS 304, and includes lock list 402, map 404, and file table 406.

Swim lanes five and six are business objects 510 and 512, which are preferably entity enterprise Java beans, which can be clustered over a variety of runtime platforms. That is, business objects 510 and 512 are preferably coarse-grained business concepts that are visible to a user in the business world. Attributes found within the entity enterprise Java beans include a high-level identifier and all data whose combination together uniquely identify the object of interest from all others stored. Many other optional or non-unique attributes may also be stored. For example, business object 510 may be a software object used to store all attributes related to a customer order, and can also identify the attributes of the user placing the order.

Swim lane seven is an enterprise lock monitoring and reporting service 514, which uses database lock requests to track and map different metrics as described below.

Creating and Using a Database Lock

Steps depicted in FIG. 5 according to the present invention are as follows. A user 516 calls a general application logic (step 518), which then determines the need for a database record lock (step 520), resulting in a lock request being built using a web service message (step 522). Note that while user 516 may be the user 102 of business 112 described above, user 516 may be any entity, either personal or electronic, needing to create, use, monitor and/or track database locks as described below so that only one user (102 or 112) is allowed to modify a database record of interest at a time.

Figure 6:
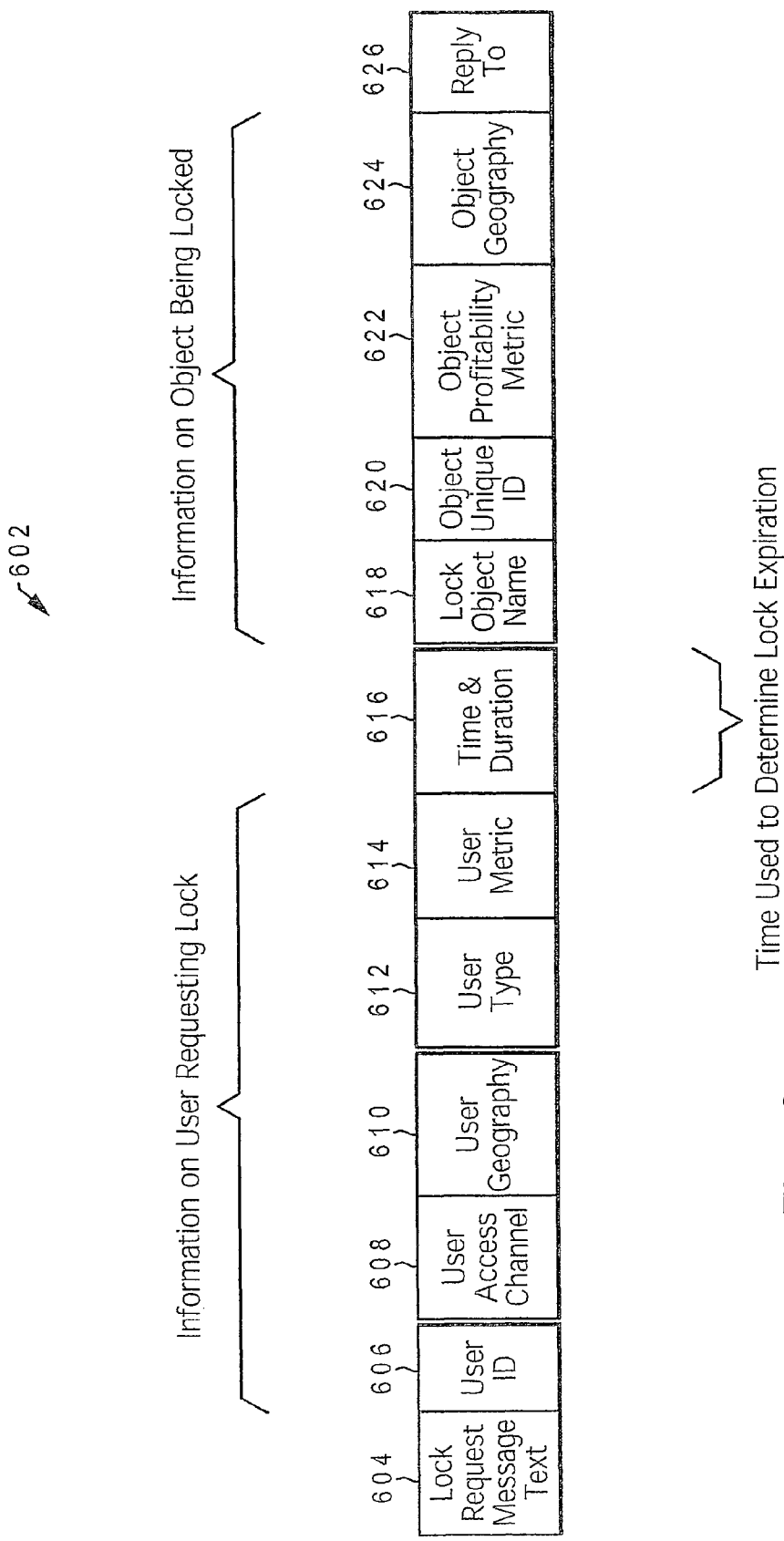
FIG. 6 is a block diagram of a lock request message.

Referring now to FIG. 6, details of an exemplary lock request message 602, built in step 522 of FIG. 5, are shown.

Lock request message 602 includes a unique lock request message text string 604 which identifies a lock request from other types of messages on the computer network. A user identifier 606 identifies the user who needs the database lock. In the case of a call center, this would be the user identifier of a customer service representative acting on behalf a customer calling on the phone. In the case of customer self-service, this would be the user identifier of the customer himself.

An access channel identifier 608 identifies what type of access (customer contact) channel that the user identified by user identifier 606 is using. Such access channels may include web sessions, a call center, a voice response unit, a kiosk, etc. Thus, the access channel may use data, voice, or both.

An optional user geographic identifier 610 identifies a geographic location of the user. This location may be at any granularity, including a world-wide location, a state-wide location, a local location, or even a location of a desk or office within an enterprise.

The user type 612 can be used to identify characteristics of the user requesting the lock such as whether the user is an internal user or external user. A call center user, for example, would likely be an internal user. A self-service web user would likely be identified as an "external" or "web user." Other possibilities include differentiating users who represent themselves (individual customers) vs. users who represent a business (corporate customer).

The user metric 614 is used to categorize or prioritize users. Examples for internal users might include regular employees vs. managers. Examples for external customers might be some profitability metric based on past transaction history.

A time identifier 616 identifies the date and time that requests for a database lock was created. With time identifier 616 may also be stored the length of time that the requested database record lock will be valid, if generated.

Lock Object Name 618 is a high-level alias name representing the type of business object that the user 606 needs to lock with the lock request message 602. This might also be described as a coarse-grained business object name such as Customer or Purchase Order. This name should be recognized by all cooperating applications using the ELS.

Object Unique Identifier 620 contains the data required to uniquely identify the single object of type specified by the lock object name 618 from all the other objects of the same type. This is equivalent to all the elements of the primary key if a relational database is used to store the object attributes.

An optional object profitability metric 622 identifies the financial strength and past profitability of the object to be locked. For example, if the user 606 is trying perform administration on a Customer object, then metrics such as "Regular," "Silver," "Gold" or "Platinum" might be provided according to the customer's average sized purchases and/or financial strength (such as a Dun and Bradstreet rating). This information may be left blank if it does not make sense to apply a profitability metric to the object type. For example, it may make no sense to apply a profitability metric to an object representing an internal user. Alternatively, the profitability metric 622 may be associated with a particular customer order or a line of products, either or both of which are described in an order and/or product database.

An optional object geography 624 is used to identify any relevant geographic association to the object to be locked. For example, if trying to lock a Customer object, then values such as "USA", "Canada", "North", or "South" might apply. The lock may be associated with either a real-time present location of a user, or may be generally associated with a database associated with such a geographic region.

A "reply to" identifier 626 provides information for sending a response from the enterprise locking service. Preferably, such a location is URL, an IP address, a telephone number, mailing address, or a physical location.

With reference again to the steps depicted in FIG. 5, the lock request message is delivered to enterprise service bus 504 (step 524). The enterprise service bus then delivers the lock request to the enterprise locking service 506. Enterprise locking service 506 then parses the lock request message (step 526), and determines if the user 516 already has a lock on the requested database record (step 528). To make this determination, a query for the lock applicable to the requested database record (identified by the Object Unique ID 620) is made of the lock database 508 (step 530). The lock database executes the query and returns the lock database record back to the enterprise locking service 506, which then inspects the user ID of the record and makes a decision as to whether the lock for the applicable database record (identified by the Object Unique ID 620) exists for user 516 (step 532). If such a lock does exist, then the timestamp on the lock is updated (step 534), the lock timestamp is updated in lock database 508 (step 535), and a "lock available" message is built (step 536). The lock available message is delivered to enterprise service bus 504 (step 538), and the lock available message is used to update potentially multiple business objects on multiple databases (step 540). That is, if user 516 needs access to multiple databases, which can be locked with a single database lock, this ability is provided in client application 502. The multiple business objects together compose a high-level object having the object name 618 and are identified uniquely by object ID 620 are shown as 510 and 512.

Business object attributes are updated in all relevant business objects (steps 542 and 544), after which the client application determines whether the lock is still needed (step 546). If the lock is no longer needed, then the client application builds a "lock release" message (step 548). The lock release message is then delivered to the enterprise service bus 504 (step 550), resulting in the user's lock being released (step 552) and deleted (step 554) in the lock database 508 (indicating that the lock is no longer currently being used). User 516 interacting with client application 502 is then "done" with the lock and other users of other clients using the same enterprise locking service 506 may now attempt to access and update the same business objects and their associated database records.

Returning to step 532, if a database lock does not exist for user 516, then the enterprise locking service inspects the lock database record returned from step 530 to determine whether another user has already locked the requested database (step 556). If another user has locked the requested database, then a "lock unavailable" message is built (step 558). The "lock unavailable" message is then delivered to the enterprise service bus 504 (step 560), resulting in the client application 502 displaying an error message to the user (step 562). This message may optionally inform the user 516 of the identity of the other user holding the lock on the desired business objects and associated database records.

Again returning to step 556, if another user has not locked the requested database record, then a brand new database lock for user 516 is created (step 564), and the new lock is inserted into lock database 508 (step 566), resulting in a "lock available" message being built (step 536), delivered to the enterprise service bus (step 538) and sent to the client application 502 where the client can potentially modify multiple business objects in step 540. The multiple business objects together compose a high-level object having the object name 618 and are identified uniquely by object ID 620 are shown as 510 and 512.

Monitoring and Reporting Database Lock Use

With reference now to the enterprise lock monitoring and reporting service lane 514, a systems management user 517 can create a query for currently active locks (step 568). The active locks are retrieved from lock database 508 (step 570), and business data associated with the active locks is gathered (step 572). From all relevant business objects (such as business objects 510 and 512), business data associated with the lock is retrieved (steps 574*a-b*), and a real-time customer "dashboard" display is created (step 576). Lock usage is compared across all customer access channels (step 578), and appropriate steps based on the comparison in step 578 are then taken (step 580). Examples of such steps taken include increasing server capacity for customer access channels with higher lock usage, or alternatively, decreasing such server capacity. Additionally, new channels may be opened or closed. Such channels include kiosks, expanded websites, phone centers, etc. The requirement for additional or fewer infrastructure resources are then communicated to the enterprise service bus 504 (step 582), above. The enterprise service bus delivers these "need more" or "need less" resources messages to the Infrastructure Services 110 tied to the enterprise service bus 108 in FIG. 1 above, thus promoting the "on demand" server infrastructure described in FIG. 1

With reference now to step 584 in the enterprise locking service 506 swim-lane, a constant loop checks for locks which have been abandoned or should be expired. To make such checks, old locks are retrieved (step 586), the old locks are then expired (step 588), and deleted (step 590).

Referring again to step 572, other metrics besides the access channel used may be monitored to create the "dashboard" display described in step 576. These metrics include, but are not limited to, those identifiers discussed above in FIG. 6.

Figure 7:
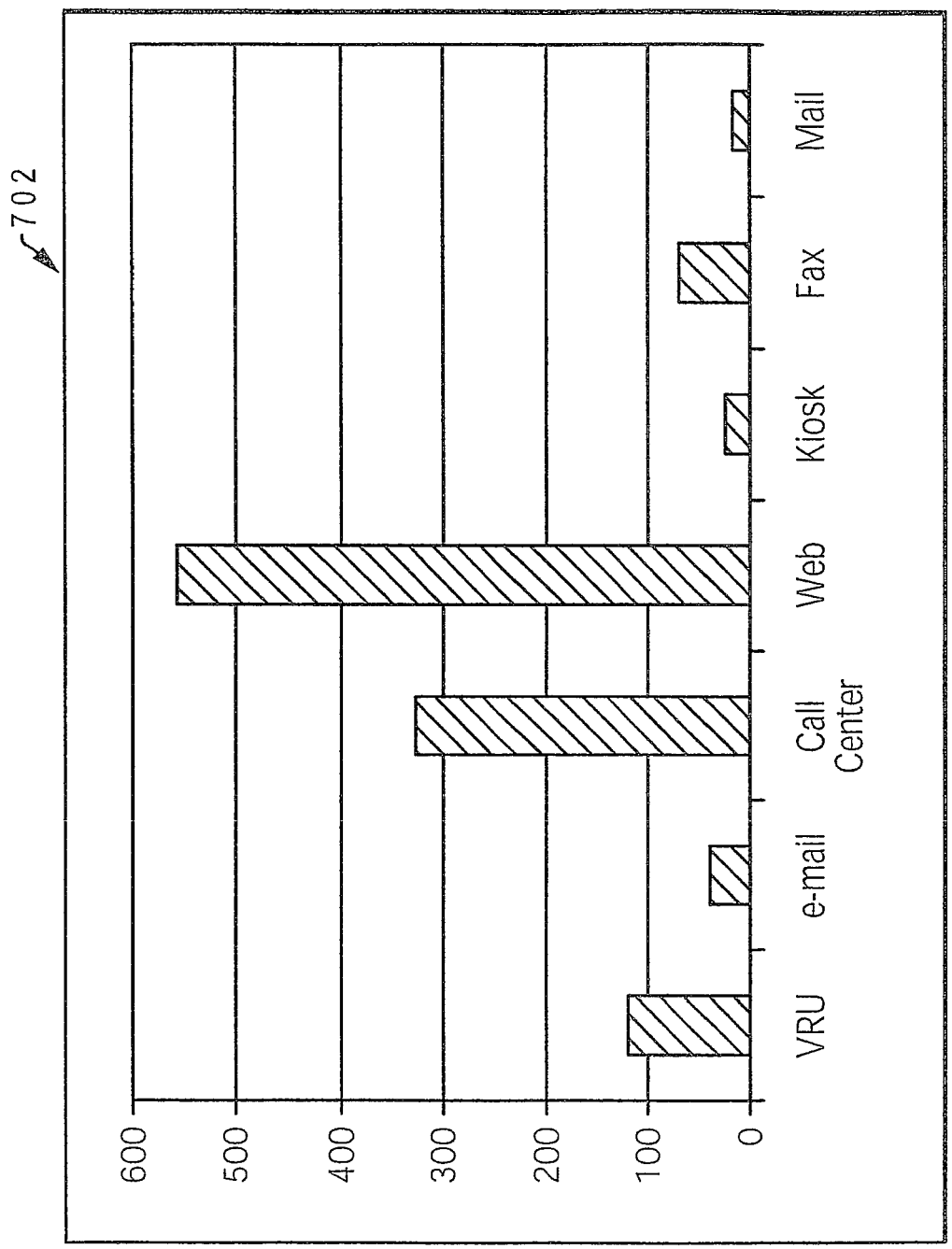
FIG. 7 is an exemplary customer contact "dashboard" based on database lock usage across all customer-related applications using the ELS.

With reference now to FIG. 7, an exemplary real-time dashboard 702 is depicted. Dashboard 700 is the result of steps described above in the enterprise lock monitoring and reporting service 514 swim-lane of FIG. 5. Dashboard 702 depicts the type of access channel source of customer orders. These access channels include voice response units (VRU), e-mail, call centers, website hits, kiosks, fax and mail channels. If a predetermined (or dynamically determined) level of traffic is exceeded (such as for call centers), then overtime for employees in existing call centers may be authorized, additional telephone lines and operators may be added, or new call centers may be opened. Conversely, if the call center(s) do not justify the traffic levels indicated, then a reduction of resources may be advised. Note that the dashboard 702 is determined by the number of lock requests submitted from the various access channels as identified by the User Access Channel 608 in the lock request message 602.

While FIG. 7 depicts a chart of requests for database locks per type of access channel, similar charts can be generated for individual locations (particular call centers, etc.). Likewise, similar charts can be generated using any of the metrics described above in FIG. 6, including user geographical regions, geographies associated with business objects, time of day, user profitability metrics (e.g., "Regular," "Silver," "Gold," "Platinum"), profitability metrics associated with the objects being locked (e.g. size of a customer order), type of user (individual/enterprise), type of client application (whether request for a lock is from a software object that places orders, creates bills, updates client information, etc.), etc.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method implemented by a data processing system, the method comprising:

establishing a computer network of databases available to a first user on an on-demand basis, wherein the computer network of databases are managed by an enterprise locking service (ELS) that comprises functional components;

the data processing system receiving a request from the first user to provide exclusive access to one or more records of the databases, the exclusive access being controlled by a database records lock that is exclusive for and identifies the first user, wherein the request comprises one or more metrics that are utilized by the ELS during processing of the request and wherein the request comprises one or more of: (1) a user metric utilized to perform one or more of categorizing and prioritizing users, wherein the metric includes a profitability metric based on past transaction history; and (2) an object profitability metric that identifies a financial strength and past profitability of the object to be lock;

a central processing unit (CPU) of the data processing system subsequently determining if each of the one or more database records is already locked by a second user;

in response to determining that one or more of the database records are not locked by the second user and are unlocked, the CPU locking those unlocked database records with the first user's database lock;

in response to determining that the database record is currently locked by the first user, the CPU updating a timestamp on the existing lock of the first user and provides a lock available message to the user;

in response to determining that one or more of the database records are locked by the second user, the CPU sending a request to the second user to unlock the locked database record; and in response to the second user unlocking the locked database record, the CPU locking the database by using the first user's database lock.

2. The method of claim 1, further comprising:

automatically locking a second database that needs to be simultaneously locked because of relational issues to a first database in response to the CPU locking the unlocked database records of the first related database with the first user's database lock, wherein the ELS includes a map of databases that need to be simultaneously locked by an entity based on relational issues to maintain data coherency; and in response to the first user requesting access to multiple databases which can be locked with a single database lock, locking the multiple databases utilizing the first user's database lock when the lock is available.

3. The method of claim 1, wherein the ELS comprises a lock list of database locks, which locks are (a) identified within the list with a particular client, and (b) are able to lock one or more of the databases, and (c) have associated entities within the list that are authorized to utilize the database lock.

4. The method of claim 1, wherein the ELS comprises: a file table of all files in all databases, and the method comprises identifying, from the file table, a particular file that is requested to be locked, and transmitting the database lock to lock out only the particular file, wherein the file table enables file-level locking capability to lock out only a particular file requested.

5. The method of claim 1, wherein the ELS comprises a translation table and the method comprises translating an authorized database lock into a format/style that is understood by the database that is to be locked, wherein one or more databases can have differently formatted database locks.

6. The method of claim 1, wherein the ELS comprises a list of active locks which includes (a) which client/user has currently locked up a database record, and which optionally includes (b) an expiration time or period of the database lock and wherein the CPU sending a request to the second user to unlock the locked database record service comprises: the CPU providing information to the first user regarding which second entity is currently locking up the database to enable the first user to contact the second entity and request that the second entity release the lock on the database record.

7. The method of claim 1, wherein the request comprises a unique lock request message text string which identifies a lock request from other types of messages on the network and a user identifier which identifies the user who needs the database lock, wherein when the request originates from a call center, the user identifier is that of a customer service representative acting on behalf of a customer calling into the call center on a phone and when the request is a customer self-service request, the user identifier is that of the customer.

8. The method of claim 1, wherein the request comprises at least one of: (1) a user type that identifies characteristics of the user, including whether the user is an internal user or an external user, an individual customer or a corporate customer; and (2) an access channel identifier which identifies what type of access channel the user is using, wherein the access channel can use data, voice, or both.

9. The method of claim 1, wherein the request comprises one or more of: (1) a geographic identifier that identifies a geographic location of the user, which can range in granularity from a location of a desk or office within an enterprise to a world-wide location; and (2) an object geography that identifies any relevant geographic association with the object to be locked and which is associated with one of a real-time present location of the user and a database associated with a particular geographical region.

10. The method of claim 1, wherein the request comprises a length of time that a requested database lock will be valid for if the lock is granted.

11. The method of claim 1, wherein the request further comprises: (1) a lock object name which represents a type of business object and which name is recognized by cooperating applications utilizing the ELS; and (2) an object unique identifier, which contains data required to uniquely identify the single object of type specified by the lock object name from all other objects of a same type.

12. The method of claim 1, further comprising:
receiving a query for currently active locks;
in response to receiving the query for currently active locks:
    retrieving a listing of active locks from a lock database and gathering data associated with the currently active locks; and
    creating a real-time customer dashboard display utilizing the gathered data, including metrics of lock request messages associated with the active locks.

13. The method of claim 12, further comprising:
comparing lock usage across all customer access channels;
in response to comparing of lock usage across the customer access channels, performing responsive actions from among: increasing server capacity for customer access channels with higher lock usage; decreasing server capacity for customer access channels with higher lock usage; opening new channels or closing existing channels, wherein the channels can include kiosks, expanded websites, and phone centers; and communicating a requirement for additional or fewer infrastructure resources to an infrastructure service via an enterprise service bus to promote an "on demand" server infrastructure.

14. The method of claim 1, further comprising:
recursively checking for locks that have been abandoned or should be expired;
retrieving and expiring old locks; and
deleting old locks that are expired.

15. A service implemented by a data processing system, the service comprising:
    establishing a web-based network that includes: a service request receiver, an enterprise locking service (ELS), and a plurality of business service providers;
    wherein the enterprise locking service comprises computer readable instructions encoded on one of a writeable and non-writable storage medium and which execute on a central processing unit (CPU) of a data processing system to cause the CPU to:
        in response to the service request receiver receiving a request from a first customer to access to a database record maintained by one or more of the plurality of business service providers, determine if the requested database record is already locked by a second customer, wherein the request comprises one or more metrics that are utilized by the ELS during processing of the request;
        in response to determining that a database record is not locked by the second customer and are unlocked, locking that database record with the first customer's database lock;
        in response to determining that the database record is currently locked by the first user, the CPU updating a timestamp on the existing lock of the first user and provides a lock available message to the user;
        in response to determining that one or more of the database records are locked by the second customer, sending a request to the second customer to unlock the locked database record; and
        in response to the second customer unlocking the locked database records, locking the database records by using the first customer's database lock;
    automatically locking a second database that needs to be simultaneously locked because of relational issues to a first database in response to the CPU locking the unlocked database records of the first related database with the first user's database lock, wherein the ELS includes a map of databases that need to be simultaneously locked by an entity based on relational issues to maintain data coherency; and in response to the request from the first user requesting access to multiple databases which can be locked with a single database lock, locking the multiple databases utilizing the first user's database lock when the lock is available.

16. The method of claim 15, further comprising:

receiving a query for currently active locks;

in response to receiving the query for currently active locks:
- retrieving a listing of active locks from a lock database and gathering data associated with the currently active locks; and
- creating a real-time customer dashboard display utilizing the gathered data, including metrics of lock request messages associated with the active locks.

17. The method of claim 16, further comprising:

comparing lock usage across all customer access channels;

in response to comparing of lock usage across the customer access channels, performing responsive actions from among: increasing server capacity for customer access channels with higher lock usage; decreasing server capacity for customer access channels with higher lock usage; opening new channels or closing existing channels, wherein the channels can include kiosks, expanded websites, and phone centers; and communicating a requirement for additional or fewer infrastructure resources to an infrastructure service via an enterprise service bus to promote an "on demand" server infrastructure.

18. The method of claim 15, further comprising:

recursively checking for locks that have been abandoned or should be expired;

retrieving and expiring old locks; and deleting old locks that are expired.

* * * * *